United States Patent
Minamitani et al.

(10) Patent No.: US 8,941,585 B2
(45) Date of Patent: Jan. 27, 2015

(54) INPUT DEVICE WITH TOUCH INPUT FUNCTION

(71) Applicant: Denso Corporation, Kariya, Aichi-pref. (JP)

(72) Inventors: Yasuo Minamitani, Anjo (JP); Hiroaki Sasaki, Chiryu (JP); Shingo Kitabayashi, Gyoda (JP)

(73) Assignee: Denso Corporation, Kariya (JP)

( * ) Notice: Subject to any disclaimer, the term of this patent is extended or adjusted under 35 U.S.C. 154(b) by 172 days.

(21) Appl. No.: 13/748,856

(22) Filed: Jan. 24, 2013

(65) Prior Publication Data
US 2013/0194214 A1 Aug. 1, 2013

(30) Foreign Application Priority Data
Jan. 26, 2012 (JP) ................................. 2012-014272

(51) Int. Cl.
| | |
|---|---|
| G09G 5/00 | (2006.01) |
| G06F 3/02 | (2006.01) |
| G06F 3/0338 | (2013.01) |
| G06F 3/0362 | (2013.01) |
| G06F 3/0354 | (2013.01) |
| G05G 1/08 | (2006.01) |

(52) U.S. Cl.
CPC ................ G06F 3/02 (2013.01); G06F 3/0338 (2013.01); G06F 3/0362 (2013.01); G06F 3/03547 (2013.01); G05G 1/08 (2013.01)
USPC ........... 345/156; 345/161; 345/184; 345/173; 345/174; 200/600; 200/4; 200/5; 200/28; 200/336

(58) Field of Classification Search
None
See application file for complete search history.

(56) References Cited

U.S. PATENT DOCUMENTS

| | | | |
|---|---|---|---|
| 5,431,266 A | 7/1995 | Ito et al. | |
| 6,219,036 B1 | 4/2001 | Urita | |
| 8,796,566 B2 * | 8/2014 | Kerner et al. | 200/4 |
| 2003/0076302 A1 | 4/2003 | Langstraat | |
| 2004/0132498 A1 | 7/2004 | Clabunde et al. | |
| 2005/0057502 A1 * | 3/2005 | Arneson et al. | 345/161 |
| 2006/0012584 A1 * | 1/2006 | Vassallo et al. | 345/184 |
| 2006/0279543 A1 * | 12/2006 | Koskinen | 345/161 |

FOREIGN PATENT DOCUMENTS

| | | |
|---|---|---|
| JP | 06-174077 | 6/1994 |
| JP | 8-320760 | 12/1996 |
| JP | 2002-163072 | 6/2002 |
| JP | 2003-146222 | 5/2003 |
| JP | 2003-150310 | 5/2003 |
| JP | 2003-280814 | 10/2003 |
| JP | 2009-026001 | 2/2009 |

* cited by examiner

*Primary Examiner* — Kent Chang
*Assistant Examiner* — Benjamin Morales Fernandez
(74) *Attorney, Agent, or Firm* — Harness, Dickey & Pierce, PLC

(57) ABSTRACT

An input device with touch input function has an input member which is operable to input at least one of shifting operation and pushing operation. The input member has a touch input device which is responsive to touch of a user. The input device has an operation sensor which detects the operation on the input member. The input member and the operation sensor provides an input unit which is supported by a support member in a manner that the input unit is movable among a lock position and an unlock position with respect to a base member on which the input unit is supported. The input device has a lock mechanism which locks the input member in inoperable condition at the lock position and which releases the input member in operable condition at the unlock position.

4 Claims, 7 Drawing Sheets

INPUT DEVICE WITH TOUCH INPUT FUNCTION

CROSS REFERENCE TO RELATED APPLICATION

This application is based on Japanese Patent Application No. 2012-14272 filed on Jan. 26, 2012, the disclosure of which is incorporated herein by reference.

TECHNICAL FIELD

The present disclosure relates to an input device having a touch input function.

BACKGROUND

In recent years, some input devices are configured to receive multiple input operations, such as a shift operation and a finger touch operation. The shift operation may be entered via a pointing input member which can be held by a user's hand or finger and may be shifted in parallel, rocked, or pushed in order to move a pointer on a display or to switch icons. The touch operation may be entered via a touch input device on which a user moves fingers in order to input motion to move a pointer or to input a character. The touch input device may have an input surface on which a user can touch and may be called as a panel, a pad or a tablet for manuscript input. It is desirable to provide an input device with compact arrangement. For example, JP2009-26001A discloses an input device which has an integrated arrangement of the pointing member for shifting operation and the touch input device for touch operation.

SUMMARY

However, in the input device disclosed in JP2009-26001A, when a user operates the touch input device, a user may unintentionally operate the pointing member. For example, when user draws a character on the touch input device, the pointing member may be shifted, pushed, or rocked by a user's finger. In another view, since the touch input device is mounted on the pointing member, the touch input device is unstable, therefore, it may be difficult to move the finger along an intended path. Therefore, the operability of the manuscript may be lowered.

The above disadvantages may arise not only in a shift operation but also in a push operation.

In view of the foregoing problems, it is an object of the present disclosure to provide an input device having a touch input function which has improved operability for touch input.

It is another object of the present disclosure to provide an input device which can reduce error input to the pointing device when a user operates the touch pad.

It is still another object of the present disclosure to provide an input device which can improve stability of the touch input device when a user operates the touch input device.

In an embodiment of the present disclosure, an input device having a touch input function is provided. The input device has an input member which is operable to input at least one of shifting operation and pushing operation. The input device has a touch input device which is responsive to touch of a user. The touch input device is disposed on a top of the input member. The input device has an operation sensor which detects the operation on the input member. The input device has a support member which supports an input unit including the input member and the operation sensor. The input unit is supported on a base member in a manner that the input unit is movable among a lock position and an unlock position with respect to the base member. The input device has a lock mechanism which locks the input member in inoperable condition at the lock position and which releases the input member in operable condition at the unlock position.

According to the embodiment, since the input member can be locked in inoperable condition when allowing a touch input via the touch input device, it is possible to keep the touch input device stable.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
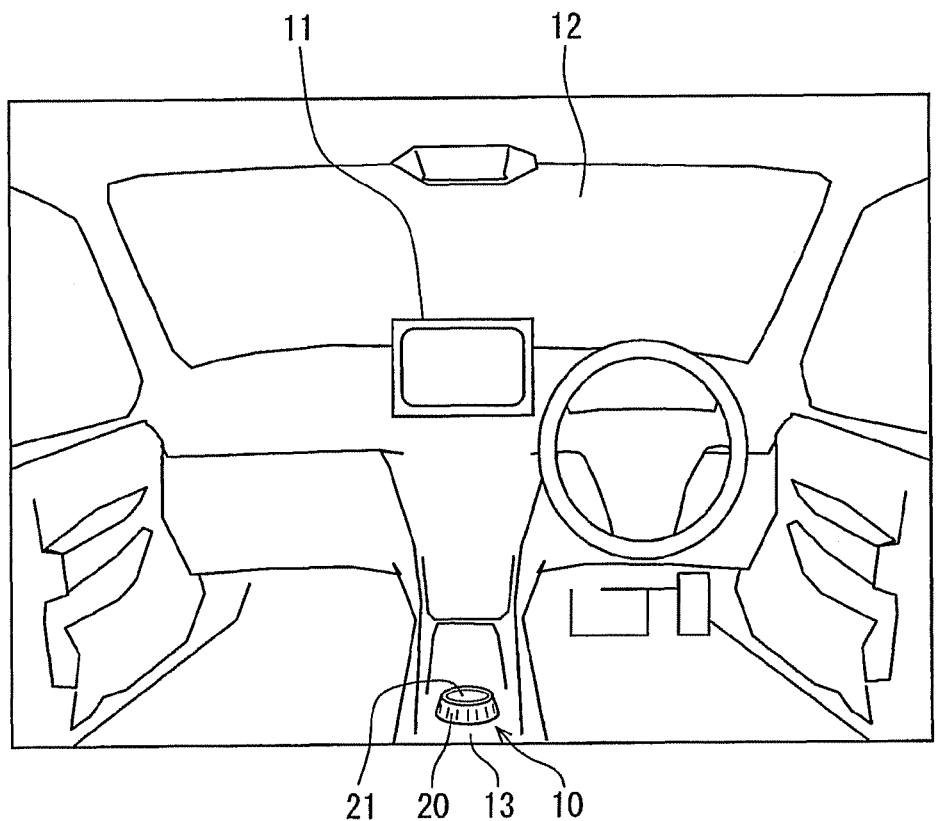
FIG. 1 is a perspective view of an automobile compartment having an input device, which is mounted on an ornamental panel of a center console, according to a first embodiment of the present disclosure.

An input device, which is an input device with manuscript input function, according to a first embodiment is described, referring to the drawings.

As shown in FIG. 1, the input device 10 is mounted on an automobile compartment. The input device 10 is installed on a position to which a user, e.g., a driver of the vehicle, can reach with her or his hand. The operation result on the input device 10 is displayed on a display device 11. The display device 11 is installed on a dash board at a position close to a front windshield 12. The input device 10 is installed on an ornamental panel 13 of a center console which is located between a driver's seat and a passenger's seat. The ornamental panel 13 provides a mounting member. In this arrangement, the input device 10 and the display device 11 are separately located on the compartment. The display device 11 is located higher location than that location of the input device 10. By disposing the input device 10 and the display device 11 separately as mentioned above, the display device 11 can be watched by the driver without largely moving a driver's sight while driving the automobile and the input device 10 can be located close to the hand of the driver.

The input device 10 is a device for operating function of an objective device. The objective device may be a device mounted on the automobile, such as a navigational device, an audio device, an air conditioning device. The display device 11 displays the operation result inputted via the input device 10 for the objective device and functional conditions of the objective device. The operational result may be referred to as an input result. The functional condition may be referred to as an operational mode. For example, the display 11 displays icons or buttons for changing functions of the objective device. The display 11 displays a pointing input in response to an input signal from the pointing device on the input device 10. The pointing input may be displayed as a movement of a pointer, change of selected icons, or initiating a selected function.

The display 11 also displays a touch input in response to an input signal from the touch input device on the input device 10. The touch input may be displayed as a path of the finger moving on the touch input device, e.g., a character, a movement of the pointer, or change of selected icons. The input member is configured to sense and input both shift movement and push movement. The input device 10 selectively allows to input the pointing input by the shift movement and the push movement, and the touch input.

The input device 10 has the input member to be manually operated by a user. The input member is operable to input at least one of shifting operation and pushing operation. In this embodiment, the input member is operable to input both the shifting operation and the pushing operation. The input member has a dial ring 20 for inputting the shift movement and a touch plate 21 for inputting the push movement. The input member has a touch input device which is responsive to touch of a user. The touch input device is provided by the touch plate 21. The touch plate 21 and the dial ring 20 are mounted on the ornamental panel 13 to be exposed to a user.

Figure 2:
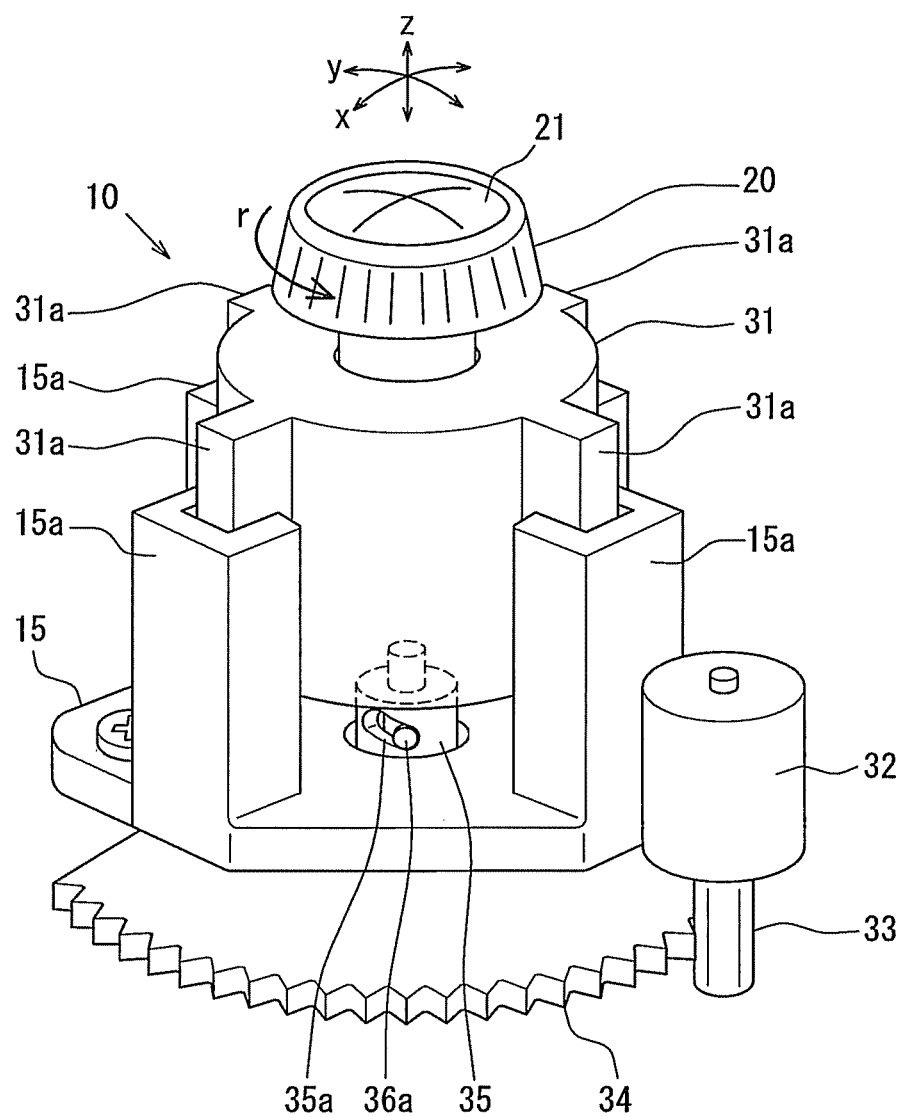
FIG. 2 is a perspective view of the input device, which is separated from the ornamental panel.
Figure 3:
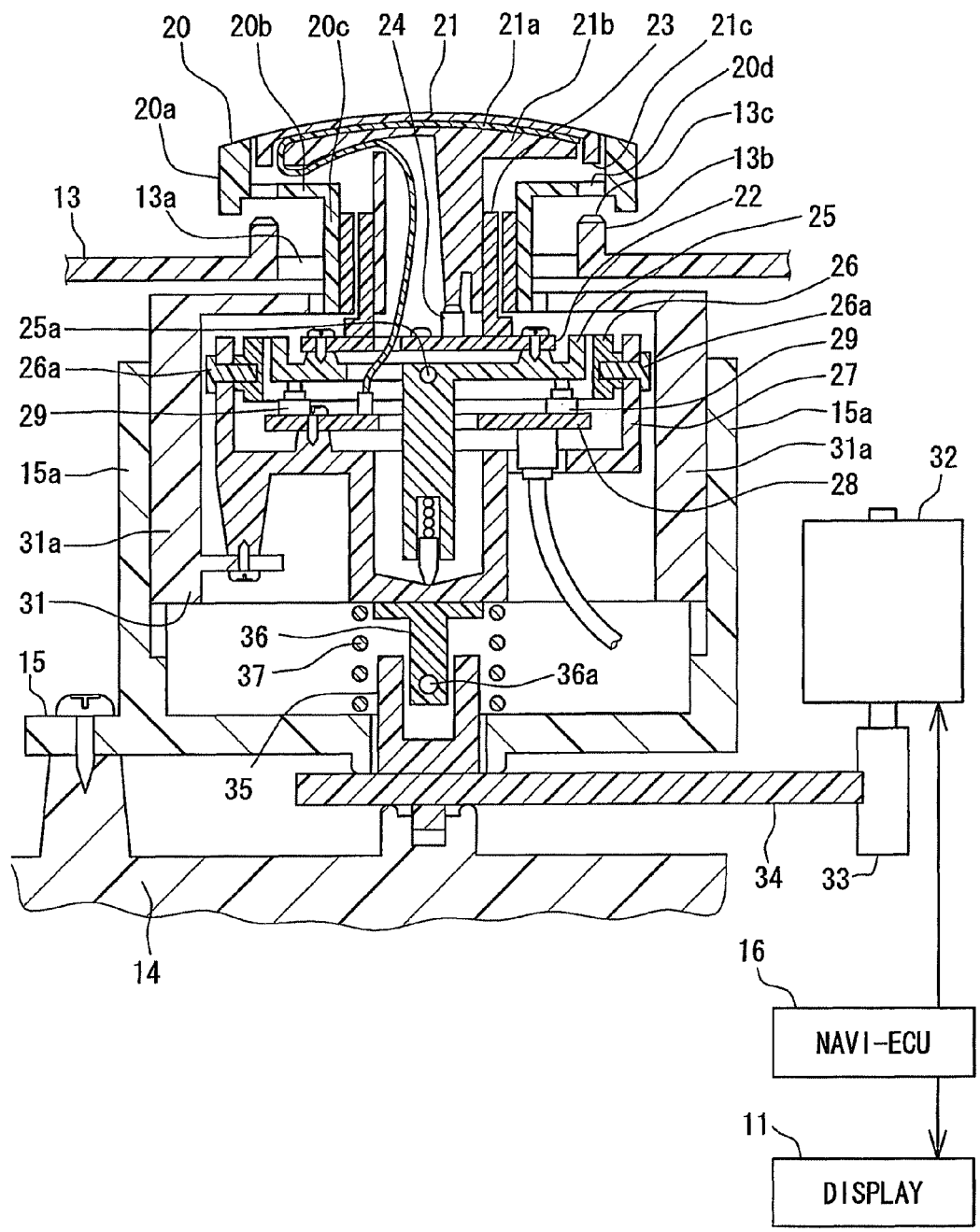
FIG. 3 is a cross sectional view of the input device and the ornamental panel.

As shown in FIGS. 2 and 3, the dial ring 20 is formed in a cylindrical shape. The dial ring 20 may be formed in a bottomed cylindrical shape. The touch plate 21 is supported on the dial ring 20. The touch plate 21 is placed on a top of the dial ring 20 to be located radial inside of the dial ring 20. As a result, the dial ring 20 and the touch plate 21 provide a mushroom shaped input member. The touch plate 21 provides a top surface of the input member. The dial ring 21 provides a main body of the input member. In FIG. 2, the ornamental panel 13 is not illustrated. An electrostatic touch film 21a is disposed on an under surface of the touch panel 21. The electrostatic touch film 21a is a sensor for detecting the fingertip on the touch panel 21. The electrostatic touch film 21a detects the locus of the fingertip on the touch plate 21 based on change of electric capacity.

The touch plate 21 and the electrostatic touch film 21a provide the touch input device which can detect location of a fingertip touching thereon. The user may sweep the touch plate 21 by the fingertip to draw a specific path thereon in order to make the electrostatic touch film 21a to receive a command for a graphical user interface or to read a character and symbol. The touch input device is disposed on a top of the input member.

The touch plate 21 and the electrostatic touch film 21a are held by a support slider 21b. The support slider 21b provides a support member for the touch plate 21 and the electrostatic touch film 21a. The support slider 21b is supported on a guide cylinder 23 in a manner that the support slider 21b can slide along the up and down direction. The guide cylinder 23 is disposed on a first circuit board 22. The up and down direction corresponds to a push direction "z" of the push movement. The first circuit board 22 is provided with a push switch 24 which provides an operation sensor. The operation sensor detects a push operation on the input member. The push switch 24 is turned on and turned off by the support slider 21b which can come in contact with the push switch 24. Therefore, if a user pushes the touch plate 21, the support slider 21b moves downwardly and acts to operate the push switch 24.

Here, a movement of a user to push down the touch plate 21 along a vertical direction, the push direction "z", to the ornamental panel 13 is referred to as a push operation. That is, the touch plate 21 also acts as a push button for operating the push switch 24. The touch plate 21 is configured to be responsive to the push operation. The touch plate 21, the support slider 21b and the guide cylinder 23 provides a push mechanism formed on the input member.

The dial ring 20 has a peripheral surface 20a which is provided to be held by a hand or a finger of a user. A bottom portion 20b formed in a ring plate shape is extended inwardly in a radial direction from an lower end of the peripheral surface 20a. A boss portion 20c formed in a cylindrical shape is prolonged in the up and down direction from the bottom portion 20b. The boss portion 20c is placed in an opening 13a of the ornamental panel 13. The dial ring 20 is formed by the peripheral surface 20a, the bottom portion 20b and the boss portion 20c which are unitary formed with resin material.

The dial ring 20 defines a reference axis which is parallel to the push direction "z". The dial ring 20 is configured to be responsive to a rotating operation. The dial ring 20 can be rotated about the reference axis. The boss portion 20c is rotatably supported on the guide cylinder 23 in a rotary direction "r". However, the boss portion 20c is engaged in the push direction "z". That is, the dial ring 20 can not be depressed by the push operation. The guide cylinder 23 is formed in a cylindrical shape. The guide cylinder 23 has an inner surface on which the support slider 21b is guided and an outer surface on which the boss portion 20c is guided.

The dial ring 20 is configured to be responsive to the shifting operation in addition to the rotating operation. Since the dial ring 20 is supported on orthogonal two axis, the dial ring 20 can be rocked in response to the shifting operation. The input member having the dial ring 20 and the touch plate 21 is configured to be able to rock in directions "x" and "y" in response to the shifting operation. In other words, the reference axis tilts in response to the shifting operation in the directions "x" and "y". Alternatively, the input member may be configured to be shifted in response to the shifting operation while keeping the reference axis on the same direction, i.e., in parallel.

Figure 4:
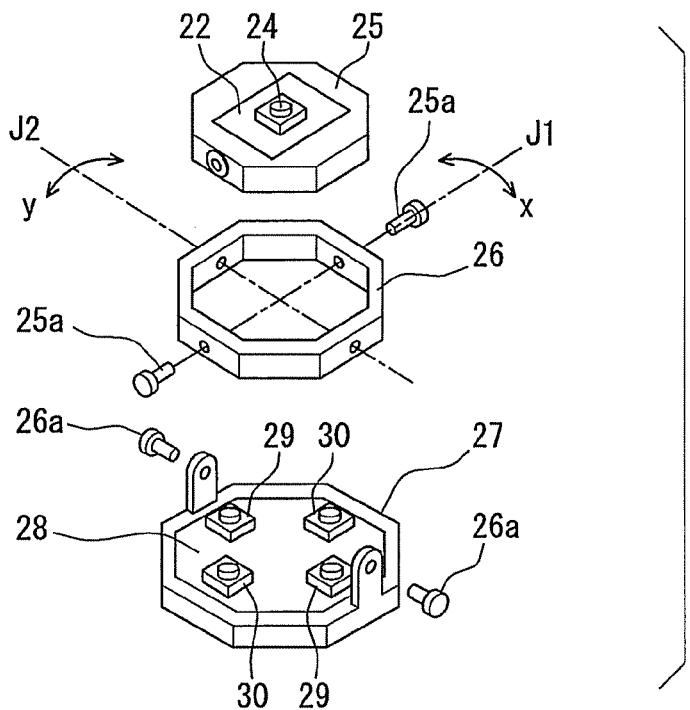
FIG. 4 is a perspective exploded view of a shifting mechanism.
Figure 5:
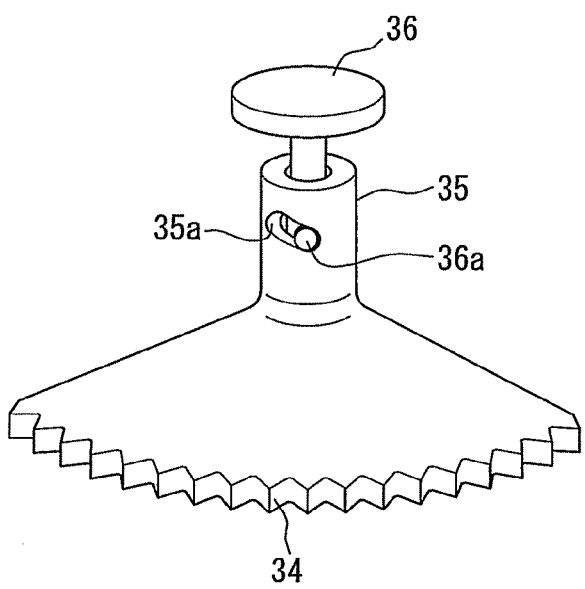
FIG. 5 is a perspective view of a link mechanism.

A shifting mechanism which supports the input member in responsive to the shifting operation is explained referring to FIGS. 3 and 4. FIG. 4 shows simplified components of the shifting mechanism in FIG. 3. The shifting mechanism is provided by an orthogonal two axis support mechanism.

The mechanism has an inner rocker 25 and an outer rocker 26. The inner rocker 25 provides a support member for supporting the first circuit board 22. The outer rocker 26 is formed in a ring shape to surround the inner rocker 25. The inner rocker 25 is supported on the outer rocker by a pair of pins 25a on. a first axis "J1". Thereby, the inner rocker 25 is supported on the outer rocker 26 by the pins 25a in a manner that the inner rocker 25 is rotatable about the axis "J1", i.e., the inner rocker 25 is able to rock in the direction "x".

The outer rocker 26 is supported on the base 27 by a pair of pins 26a. Thereby, the outer rocker 26 is supported on the base 27 by the pins 26a in a manner that the outer rocker 26 is rotatable about the axis "J2", i.e., the outer rocker 26 is able to rock in the direction "y". Therefore, the inner rocker 25 is held on the base 27 in a manner that the inner rocker 25 is rotatable about both orthogonal axis "J1" and "J2", i.e., the inner rocker 25 is able to rock in both directions "x" and "y". Therefore, the input member having the dial ring 20 and the touch plate 21 is supported on the base 27 in a manner that the input member can be shifted, i.e., rocked. In this arrangement, the components supported on the inner rocker 25 are also rocked. For example, the guide cylinder 23, which is a component of the push mechanism, is also rocked with the dial ring 20.

The base 27 supports a second circuit board 28 on which an operation sensor for detecting the shifting operation is mounted. The operation sensor has a pair of shift switches 29 for detecting tilt movement of the input member in the direction "x". The operation sensor also has a pair of shift switches 30 for detecting tilt movement of the input member in the direction "y".

The shift switches 29, 30 provide an operation sensor which detects the operation on the input member. In detail, the shift switches 29 are provided in a manner that one of the shift switches 29 is pushed by the inner rocker 25 when the input member is tilted more than a predetermined angle in a forward or backward along the direction "x". The shift switches 30 are provided in a manner that one of the shift switches 30 is pushed by the inner rocker 25 when the input member is tilted more than a predetermined angle in a forward or backward along the direction "y". Thereby, it is possible to detect whether the input member is shifted or not, i.e., operation condition of the input member.

The stator base 27 is fixed on a case 31. The case 31 provides a support member for the input unit. The orthogonal two axis support mechanism provided by the inner rocker 25, the outer rocker 26 and the stator base 27 is disposed in the case 31. As shown in FIG. 2, the case 31 has a plurality of rails 31a on an outside surface thereof. A bracket 15 is fixedly mounted on a base 14. The bracket 15 provides a base member which is stable on the automobile body. The bracket 15 has a guide portion 15a which guides the rail 31a along the push direction "z".

The components supported on the case 31 provide the input unit. Since the input unit is supported on the case 31, as the case 31 moves along the push direction "z", the input unit also moves with the case 31.

When the case 31 moves in a downward direction along the direction "z" and reaches to a predetermined lock position, then, the input member is locked by a lock mechanism in a manner that the input member is inoperable about both the push operation and the shift operation. Thereby, both the push switch 24 and the shift switches 29, 30 are maintained in an off position, and are held inoperable to an on position.

When the case 31 moves in an upward direction along the direction "z" and reaches to a predetermined unlock position, then, the input member is unlocked by a lock mechanism in a manner that the input member is operable about both the push operation and the shift operation. Thereby, both the push switch 24 and the shift switches 29, 30 are operable to the on position in response to the operations of a user.

The case 31 provides a support member 31 which supports the input unit including the input member and the operation sensor 29, 30. The support member 31 is supported on the base member 15 in a manner that the input unit is movable among a lock position and an unlock position with respect to the base member 15. The case 31 and the bracket 15 provide a movable support mechanism which supports the input unit in a movable manner in the push direction "z".

An actuating mechanism which moves the input unit is explained referring to FIGS. 2, and 5-8.

The input device 10 has an electric motor 32. The electric motor 32 provides an electric actuator which moves the input unit along a direction in which the input unit is movably supported by the support member.

The electric motor 32 is controlled by a NAVI-ECU 16. The position control for the input unit is automatically performed by the NAVI-ECU 16 in order to switch the input device 10 among a pointing input mode and a touch input mode. The NAVI-ECU 16 is an electronic control unit which controls operational condition of a navigation device for performing drive navigation by displaying a map, a present location of the automobile, and route information to a destination on the display device 11. In this embodiment, the NAVI-ECU 16 is configured to perform a control for the electric motor 32 too.

Figure 6:
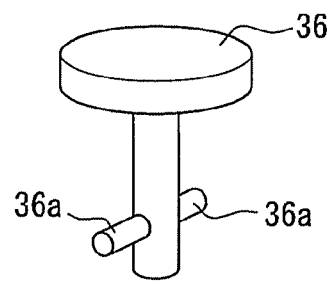
FIG. 6 is a perspective view of a component of the link mechanism.

As shown in FIG. 3, a pinion gear 33 is fixed on an end of a shaft of the electric motor 32. The pinion gear 33 is engaged with a driven gear 34. The driven gear 34 has a link rotor 35 which is disposed on an axis of rotation of the driven gear 34. As shown in FIG. 6, the link rotor 35 supports the link slider 36 in an axially movable manner. The link slider 36 is engaged with the link rotor 35 in order to convert a rotation of the link rotor 35 into an axial movement of the link slider 36. The link rotor 35 has a pair of link grooves 35a to provide cam surfaces. The link slider 36 has a pair of link pins 36a to provide cam followers. The link pins 36a are placed in the link grooves 35a to engage each other. The link grooves 35a are formed to extend along a circumferential direction of the link rotor 35 and inclined slightly in vertical direction. The link grooves 35a are formed to extend along a moving direction, the push direction "z", and a circumferential direction about the moving direction.

The link slider 36 is fixed to the stator base 27. The stator base 27 is fixed to the case 31. The case 31 cannot rotate about an axis of the movable direction of the input unit, since a rotation of the case 31 is restricted by the guide member 15a. Therefore, the link slider 36 cannot rotate about an axis of the movable direction of the input unit. Even if the link rotor 35 is rotated, the link slider 36 does not rotate. As a result, as the link groove 35a rotates, the link groove 35a pushes the link pin 36a to move linearly in the up and down direction, the push direction "z".

By activating the electric motor 32 to rotate the pinion gear 33, the driven gear 34 and the link rotor 35 are rotated. As the link rotor 35 is rotated, the link groove 35a pushes the link pin 36a, and the link slider 36 linearly moves in the push direction "z". Thereby, the whole input unit moves in the push direction "z". In the illustrated example shown in FIG. 5, when the driven gear 34 is rotated in a counterclockwise direction, the link groove 35a pulls down the link pin 36a to move the link slider 36 downward.

A linear movable range of the input unit is defined by a length of the link groove 35a. When the link pin 36a is placed on an upper end of the link groove 35a, the input unit is placed on the most upward position, which corresponds to the unlock position. When the link pin 36a is placed on a lower end of the link groove 35a, the input unit is placed on the most downward position, which corresponds to the lock position.

Figure 7:
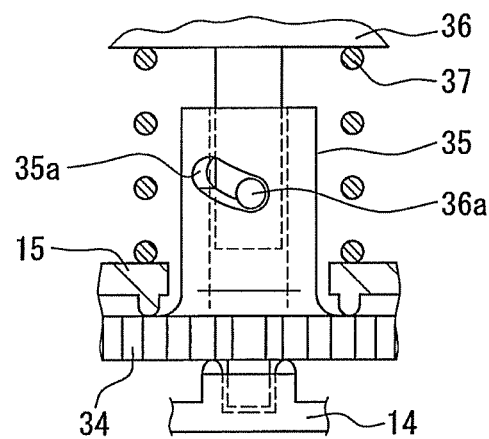
FIG. 7 is a partial side view of the link mechanism.
Figure 8:
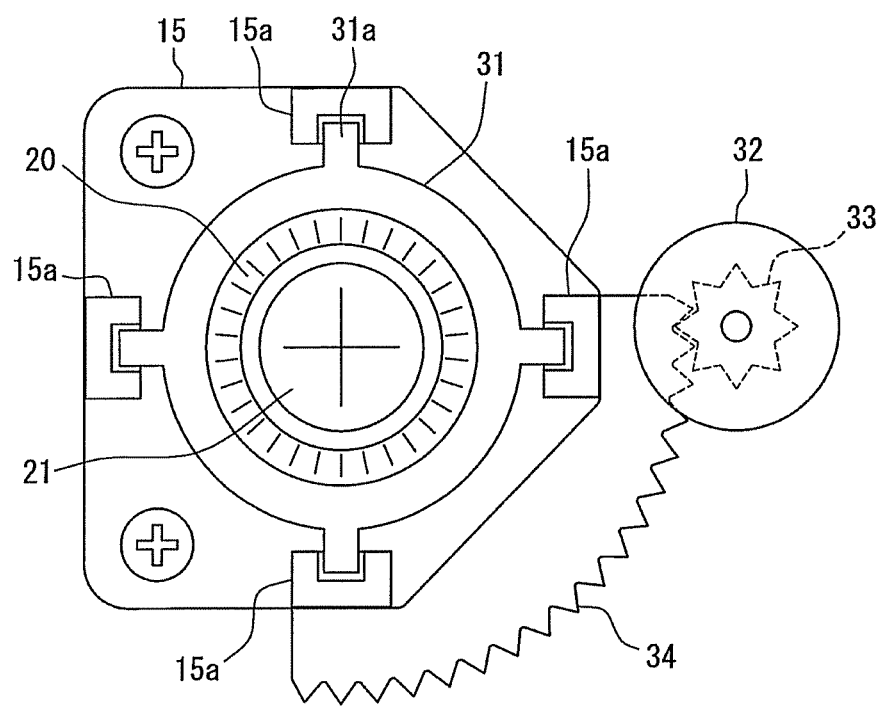
FIG. 8 is a top view of the link mechanism.

As shown in FIGS. 3 and 7, a coil spring 37 is disposed to push the input unit upwardly. The coil spring 37 is placed between the bracket 15 and the link slider 36. The coil spring 37 always urges the link slider 36 upwardly. Therefore, when pulling down the input unit by the electric motor 32, the input unit is pulled down against an elastic power of the coil spring 37.

The input device 10 has a detecting module which detects a resting or an abutment of the end of the pin 13b onto a resting portion 21c. The detecting module may be provided by a current sensor for detecting current value supplied to the electric motor 32, and a controller provided by the NAVI- ECU 16. The NAVI-ECU 16 may provide a module which stops current supply to the electric motor 32 when the current detected by the current sensor exceeds a predetermined value. When the current exceeds the predetermined value, it may be considered that the link pin 36a reaches to and rests on an upper end or lower end of the link groove 35a. Alternatively, when the current exceeds the predetermined value, it may be considered that the pin 13b reaches to and rests on the resting portion 21c.

Figure 9:
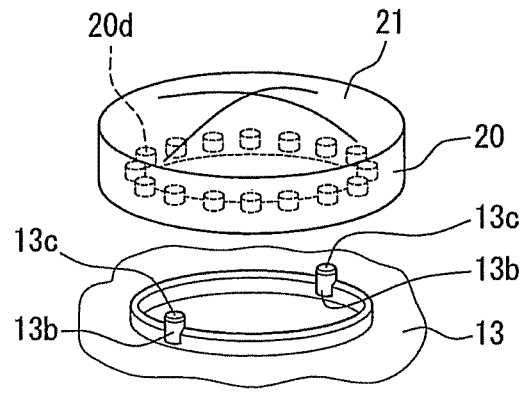
FIG. 9 is a perspective view of a lock mechanism.
Figure 10:
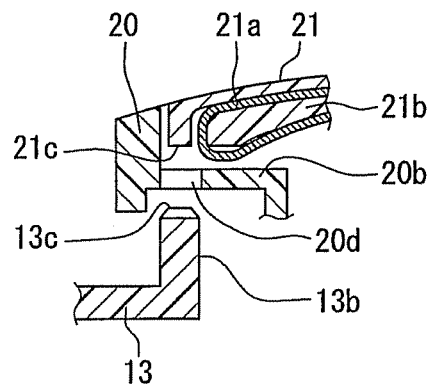
FIG. 10 is a cross sectional view of the lock mechanism in an unlock state.

A lock mechanism which locks the input member is explained referring to FIGS. 3, and 9-10. The lock mechanism locks the input member in inoperable condition at the lock position and which releases the input member in operable condition at the unlock position. The lock mechanism has a hole formed on one of the input member and the base member, and a pin formed on the other one of the input member and the base member. The lock mechanism is configured to insert the pin into the hole as the input unit is moved from the unlock position to the lock position. The lock mechanism further has a resting portion on which an end of the pin rests when the input unit is in the lock position. The lock mechanism restrains the input member with respect to the base member in the shifting direction by engaging the pin and the hole. The lock mechanism restrains the input member with respect to the base member in the vertical direction by resting the resting portion on the end of the pin.

The dial ring 20 has at least one hole 20d. The hole 20d penetrates the bottom portion 20b in order to provide a direct access to an outer rim of the touch plate 21 from a lower side. The ornamental panel 13 has at least one pin 13b. The pin 13b protrudes upwardly. The hole 20d is formed to receive the pin 13b with a small gap. The pin 13b is formed to be contact with the outer rim of the touch plate 21 by a top end thereof when the pin 13b is inserted into the hole 20d. In the illustrated example, a plurality of holes 20d and a plurality of pins 13b are formed.

Figure 11:
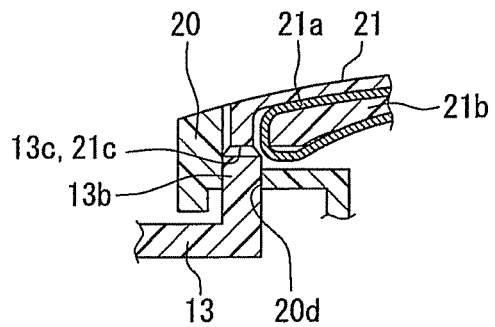
FIG. 11 is a cross sectional view of the lock mechanism in a lock state.
Figure 12:
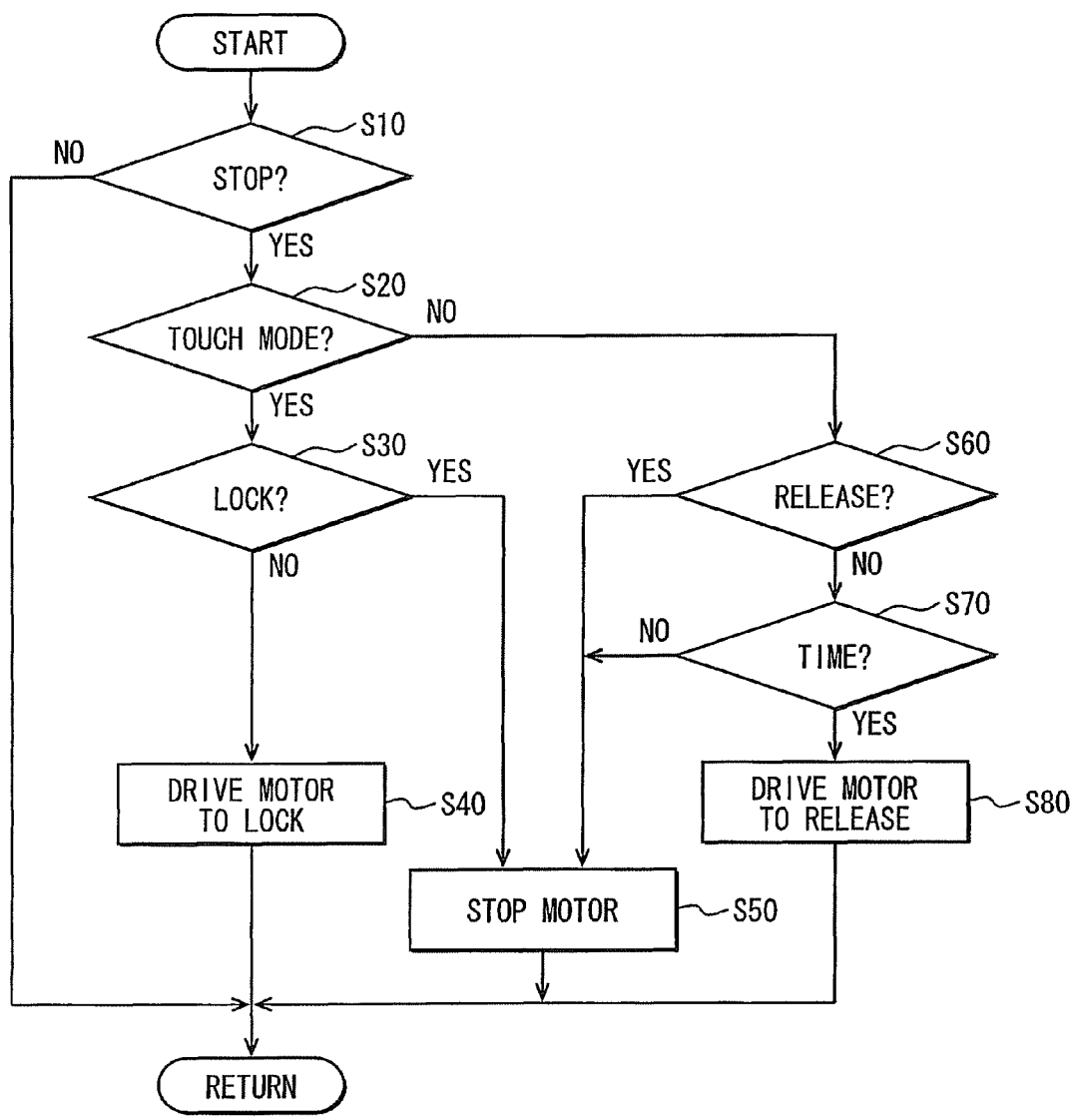
FIG. 12 is a flow chart showing a control sequence to move the operation unit.

As shown in FIG. 11, when the input unit moves downwardly and reaches to the lock position, the pin 13b is inserted into the hole 20d and engages tightly. Thereby, the input member is held in condition impossible to tilt. That is, the input member is locked in condition where the input member is impossible to operate by the shifting operation. On the other hand, as shown in FIG. 10, when the input unit moves upwardly and reaches to the unlock position, the pin 13b is pulled out from the hole 20d. Thereby, the input member is held in condition possible to tilt. That is, the input member is unlocked in condition where the input member is possible to operate by the shifting operation. The hole 20d and the pin 13b provides the lock mechanism.

In the illustrated example, two pins 13b are formed. There are more holes 20d than the number of pins 13b. The holes 20d are arranged circumferentially with even interval pitch. The pitch is set to be equal to a click pitch of rotation of the dial ring 20 or equal to the integral multiple of the click pitch.

The dial ring 20 is configured to provide click feeling when a user rotates the dial ring 20. The dial ring 20 tends to be easily stopped at positions defined by the click feeling. These positions are apart from each other with a predetermined rotational pitch, i.e., the click pitch. The pins 13b are arranged at positions where the holes 20d are located when the dial ring 20 is stopped in response to the click pitch. Therefore, if the dial ring 20 stops at a predetermined rotational position defined by the click pitch, the pins 13b are placed to encounter the holes 20d. In other words, the pins 13b and the holes 20d are arranged to enable engagement at all predetermined rotational positions of the dial ring 20.

Furthermore, when the input unit is actuated downwardly to the lock position, the insertion end 13c of the pin 13b comes in contact with and rests on the resting portion 21c. FIG. 11 shows the lock position, where the end 13c of the pin 13b is resting on the resting portion 21c formed on the dial ring 20. Thereby, the input member having the touch plate 21 becomes impossible to be depressed. In other words, the input member is locked in an inoperable condition in which it is impossible to depress the input member further. On the other hand, when the input unit is actuated upwardly to the unlock position, the pin 13b is disengaged from the hole 20d. FIG. 10 shows the unlock position, where the pin 13b is released from the hole 20d. As a result, a lock for the input member is released. In the unlock position, the input member can be operated both in the shifting direction and the pushing direction.

FIG. 11 shows a control for the electric motor 32 performed by the NAVI-ECU 16. The NAVI-ECU 16 provides a control device for the input device 10. FIG. 11 is a flow chart which shows processing procedure performed by a CPU of a microcomputer in the NAVI-ECU 16, and which is repeatedly performed with a predetermined interval, e.g., a calculation cycle of the CPU.

In S10, it is determined that whether the automobile is stopped or not. If the automobile is still running, the input operation on the input member should be inhibited. Therefore, the processing is finished in order to inhibit an activation of the electric motor 32. During the automobile is still running, even if a user operates the input member, the NAVI-ECU 16 neglects a user's input via the input member in order to inhibit manual operation on the navigation components.

If it is determined that the automobile is stopped (S10: YES), the processing proceeds to S20. In S20, it is determined that (determination means), it is determined whether the NAVI-ECU 16 is in a touch input mode for requesting a touch input or not. For example, when a user places a fingertip on the touch input device 21 in order to enter a touch input, it is determined that the NAVI-ECU 16 is in the touch input mode. Alternatively, when menu contents displayed on the display device 11 is contents for waiting a touch input or contents for promoting touch input, it is determined that the NAVI-ECU 16 is in the touch input mode. Therefore, S20 provides a determining module which determines that whether an objective device, e.g., the NAVI-ECU 16, is in a touch input mode for requesting a touch input or not. The objective device functions in response to an input operation on the input member 20. The touch input mode is determined based on functional condition of the objective device or touch condition on the touch input device.

If the touch input mode is determined (S20: YES), in S30, it is determined that whether the input unit is in the lock position or not. For example, the lock position may be determined if the following two conditions are satisfied: (1) an over current in which a detected current value detected by the current sensor is increased more than a predetermined value during the electric motor 32 is activated toward the lock position; and (2) the electric motor 32 is not activated toward the unlock position after the over current is detected.

If it is determined that the input unit is not in the lock position (S30: NO), the processing proceeds to 540, and the electric motor 32 is activated toward the lock position. On the other hand, if it is determined that the input unit is in the lock position (S30: YES), the processing proceeds to S50, and the electric motor 32 is deactivated or maintained in stopped condition.

If the touch input mode is not determined (S20: NO), in S60, it is determined that whether the input unit is in the unlock position or not. For example, the unlock position may be determined if the following two conditions are satisfied: (1) an over current in which a detected current value detected by the current sensor is increased more than a predetermined value during the electric motor 32 is activated toward the unlock position; and (2) the electric motor 32 is not activated toward the lock position after the over current is detected.

If it is determined that the input unit is not in the unlock position (S60: NO), the processing proceeds to S70 and it is determined that whether a predetermined stand-by time has elapsed or not. A time period is measured from a time of changing from an affirmative result to a negative result in S20 due to changing from the touch input mode to other modes. If the input unit reaches to the unlock position during a measuring of the time period (S60: YES), measured value of the time period is reset.

If it is determined that the stand-by time has not elapsed (S70: NO), then, the electric motor 32 is maintained in stopped condition. If it is determined that the stand-by time has elapsed (S70: YES), then, the electric motor 32 is activated toward the unlock position. Therefore, S40 provides a control module which controls the electric actuator 32 to move the input unit to the lock position when the determining module determines that the objective device is in the touch input mode.

According to the embodiment, the touch input device is provided as a component of the input member. Therefore, it is possible to provide a small and compact input device, compared with a case in which the touch input device is arranged independently from the input member. Since the input member is disposed on a predetermined location on the compartment, there may be a limited freedom of the posture of a user at the time of an input via the touch input device. Therefore, if the touch input device is unstable, operability of the touch input device may be significantly lowered.

However, in this embodiment, the input member is locked in not movable condition in both the shifting direction and the push direction. Therefore, the touch input device can be fixed and held stable even if a user touches or pushes the touch input device. Therefore, it is possible to improve operability of the touch input device by avoiding an error input.

When changing from the unlock position to the lock position, it is required to keep the switches 24, 29, 30 not operated by the movement of the input member. If the input member alone is moved separately from the switches 24, 29, 30, it is necessary to design additional means to prevent unintentional operation on the switches 24, 29, 30. According to the embodiment, the input member itself, which operates the switches 24, 29, 30, is locked by moving both the input member and the switches 24, 29, 30. Therefore, it is easy to keep the input member and the switches 24, 29, 30 in not operated condition during the movement to the lock position.

It is possible to provide a simple and reliable structure for locking the input member and for keeping the switches not operated. In addition, since the input unit moves as a whole, it is possible to use a multi purpose input unit with a little modification.

According to the embodiment, by merely moving the input unit in the push direction "z", the pins 13b are inserted into the holes 20d, and the end 13c of the pins 13b rests on the resting portion 21c. Thereby, the input member is locked in all shifting directions "x" and "y". In addition, the input member is locked in the push direction "z". Thereby, the movable support mechanism can be provided by a simple structure in which the rail 31a and the guide portion 15a are formed. The lock mechanism can be provided by a simple structure in which the pins 13b and the holes 20d are formed.

Furthermore, since the input unit is automatically moved, i.e., pulled down, by the electric motor 32 in response to a determination of the touch input mode, it is possible to improve usefulness.

In the embodiment, the electric motor 32 is automatically operated to release the input unit in response to a determination that a predetermined time has elapsed from a time of changing from the touch input mode to other modes. Therefore, the input member is not released promptly after detecting a changing from the touch input mode to other modes. For example, in a case that a changing from the touch input mode to other modes is determined by a detaching of a finger tip from the touch plate 21, the lock for the input member is not released immediately. Therefore, it is possible to reduce early releasing of the input member.

Other Embodiments

The present disclosure is not limited to the above-mentioned embodiments, but may be implemented by the following modification. In addition, the parts and components in the embodiments may be combined freely.

In the illustrated embodiments, the input member is configured to allow both the shift movement and the push movement, and is configured to be locked in both movements by the lock mechanism. Alternatively, the input member may be configured to allow one of the shift movement and the push movement, and is configured to be locked in the allowing movement by the lock mechanism.

In the illustrated embodiments, the touch plate 21 alone is configured to be depressed in response to the push operation. However, alternatively, the input member may be configured to allow that the dial ring 20 may be depressed in response to the push operation. That is, in this case, instead of providing push switch function to the touch plate 21, a similar push switch function is provided to the dial ring 20.

In the illustrated embodiments, the lock mechanism is provided by the holes 20d formed on the dial ring 20 and the pins 13b formed on the ornamental panel 13. Alternatively, the lock mechanism may be provided by the pins formed on the dial ring 20 and the holes formed on the ornamental panel 13.

Although the lock mechanism has two pins 13b in the illustrated embodiments, more than three pins 13b may be formed. Alternatively, single pin 13b may be formed to provide a similar advantage.

Although the electric motor 32 is used as an actuator for moving the input unit, an electromagnetic solenoid may be used as the actuator. Alternatively, the actuator may be omitted, and the input unit may be configured to be moved manually. For example, the input device may employ a structure in which the input unit is supported in a manner that the input unit can be depressed manually, and in which a lock mechanism which locks the input unit at the depressed position is employed.

Although the resting portion 21c is formed on the touch plate 21, the resting portion 21c may be formed on the support slider 21b.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An input device with touch input function, comprising:
an input member which is operable to input at least one of shifting operation and pushing operation;
a touch input device which is responsive to touch of a user and is disposed on a top of the input member;
an operation sensor which detects the operation on the input member;
a support member which supports an input unit including the input member, the touch input device and the operation sensor, and is supported on a base member in a manner that the input unit is movable among a lock position and an unlock position with respect to the base member;
a lock mechanism which locks the input member in inoperable condition at the lock position and which releases the input member in operable condition at the unlock position;
an electric actuator which moves the input unit along a direction in which the input unit is movably supported by the support member;
a determining module which determines that whether an objective device, which functions in response to an input operation on the input member, is in a touch input mode for requesting a touch input or not based on functional condition of the objective device or touch condition on the touch input device; and
a control module which controls the electric actuator to move the input unit to the lock position when the determining module determines that the objective device is in the touch input mode.

2. The input device claimed in claim 1, wherein
the input member is configured to be shifted in response to the shifting operation,
the support member supports the input unit in a vertical direction with respect to the direction of the shifting operation on the input member, and
the lock mechanism has a hole formed on one of the input member and the base member, and a pin formed on the other one of the input member and the base member, and is configured to insert the pin into the hole as the input unit is moved from the unlock position to the lock position.

3. The input device claimed in claim 2, wherein
the input member is configured to be shifted in response to the shifting operation and to be pushed in response to the push operation, and wherein
the lock mechanism further has a resting portion on which an end of the pin rests when the input unit is in the lock position.

4. The input device claimed in claim 3, wherein
the lock mechanism restrains the input member with respect to the base member in the shifting direction by engaging the pin and the hole, and restrains the input member with respect to the base member in the vertical direction by resting the resting portion on the end of the pin.

* * * * *